(12) United States Patent
Kurimoto

(10) Patent No.: US 6,313,548 B1
(45) Date of Patent: Nov. 6, 2001

(54) POWER SWITCHING DEVICE

(75) Inventor: Mitsuhiro Kurimoto, Machida (JP)

(73) Assignee: Hochiki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/455,755

(22) Filed: Dec. 7, 1999

(30) Foreign Application Priority Data

Dec. 16, 1998 (JP) ................................................ 10-357036

(51) Int. Cl.[7] ...................................................... H02J 1/10
(52) U.S. Cl. ............................................................. 307/43
(58) Field of Search ................................. 307/43, 44, 45, 307/64, 65, 66

(56) References Cited

U.S. PATENT DOCUMENTS 4,010,381 * 3/1977 Fickenscher et al. ................. 307/66

* cited by examiner

*Primary Examiner*—Edward H. Tso
(74) *Attorney, Agent, or Firm*—Lackenbach Siegel Marzullo Aronson & Greenspan, P.C.

(57) ABSTRACT

A power switching device includes a switching relay for supplying power to a main circuit by switching between power from a main power supply and power from a supplementary power supply, and a control unit for controlling the switching relay. The control unit includes a voltage detecting unit for detecting a voltage value of the power supplied by either the main power supply or the supplementary power supply. The power switching device includes a first switch assisting unit, composed of semiconductor switching elements, for feeding the power from the main power supply to the main circuit when the voltage detecting unit detects that the voltage value of the power is above a predetermined value, and a second switch assisting unit, composed of semiconductor switching elements, for feeding the power from the supplementary power supply to the main circuit when the voltage detecting unit detects that the voltage value of the power is below the predetermined value. The power switching device performs an effective instantaneous remedial step for a power interruption, without the need for a capacitor.

5 Claims, 5 Drawing Sheets

POWER SWITCHING DEVICE

BACKGROUND OF THE INVENTION

1. Field of the Invention

The present invention relates to a power switching device which switches between power supplied from a main power supply and power supplied from a supplementary power supply to supply the selected power to a main circuit.

2. Description of the Related Art

Any instantaneous power interruptions are not permitted in facilities, such as fire alarm systems. The control panel of such a facility is equipped with a power switching device. The power switching device continuously feeds reliable power to a main circuit in the control panel by selecting between power from a main power supply and power from a supplementary power supply. FIG. 5 is a block diagram of a conventional power switching device. As shown, the power switching device is housed in the control panel, and switches between power supplied from a main power supply ME (utility service line, for example, a commercial 100-volt power line) external to the control panel and power supplied from a supplementary power supply SE (of 24 VDC, for example) arranged in the control panel.

The conventional power switching device includes an NV (No-Voltage) relay 101 as a switching element, a control unit 102 for controlling the NV relay 101, and a capacitor C100. The control unit 102 includes a voltage detecting unit 121 for detecting the voltage of the power supplied by either the supplementary power supply SE or the main power supply ME, a NOT gate 122, namely, an inverter, for inverting an output signal of the voltage detecting unit 121, and a driver 123 for driving the NV relay 101 in response to an output of the NOT gate 122.

In the power switching device thus constructed, the NV relay 101 is connected to the supplementary power supply SE at its initial state prior to the application of power to the control panel. In the power-on operation of the supplementary power supply and the main power supply, the power supplied by the supplementary power supply is initially supplied to a main circuit MS. When the voltage detecting unit 121 detects that a voltage value of the power supplied by the main power supply ME rises above a predetermined value, the voltage detecting unit 121 outputs a signal indicating a LOW state. The LOW-state signal is inverted by the NOT gate 122 into a HIGH-state signal, which is then fed to the driver 123. In response to the HIGH-state signal, a transistor in the driver 123 is driven, thereby feeding a voltage to the NV relay 101. The NV relay 101 is switched to the side of the main power supply ME. In this way, the power from the main power supply ME is fed to the main circuit MS. This switching operation is performed at the power-on operation because the power supplied by the main power supply is not stable immediately subsequent to the power on. The supplementary power supply thus needs to feed power until the main power supply becomes stabilized.

When the voltage detecting unit 121 detects that the voltage value of the power supplied from the main power supply ME drops below the predetermined value as a result of an interruption of the power from the main power supply ME in the above state, the voltage detecting unit 121 outputs a HIGH-state signal. The NOT gate 122 inverts the HIGH-state signal into a LOW-state signal, which is then fed to the driver 123. With the driver 123 receiving the LOW-state signal, the transistor stops conducting, thereby suspending the voltage application to the NV relay 101. The NV relay 101 is connected back to the supplementary power supply SE. The power from the supplementary power supply is then fed to the main circuit MS.

The conventional power switching device performs the above switching sequence, thereby reliably feeding power to the main circuit MS.

The operation speed of the NV relay 101 is slow. To avoid a power interruption during the slow power switching operation, power stored in the capacitor C100 is used to compensate for a lack of power during the power switching operation. Specifically, the capacitor C100 is charged with the power from the main power supply ME or the supplementary power supply SE, and the capacitor C100 feeds power to the main circuit MS for a duration of several milliseconds, from the moment the NV relay 101 is driven to the completion of the switching operation, in the switching operation. Because of the need for compensating for the power during the switching operation of the slow-speed NV relay 101, a high-capacitance capacitor as high as several tens of thousands micro farads is employed for the capacitor C100.

In the conventional power switching device, the capacitor C is used to preclude a power interruption during the power switching operation. If the switching operation is carried out before the capacitor C is sufficiently charged, the capacitor C has not enough power to discharge. The use of the capacitor C is not a good instantaneous remedial step. The high-capacitance capacitor of several tens of thousands microfarads is expensive, thereby leading to a cost increase of the entire power switching device. Such a capacitor, in need of ample space for installation, presents difficulty in the miniaturization effort of the entire power switching device.

SUMMARY OF THE INVENTION

Accordingly, it is an object of the present invention to provide a power switching device which takes an instantaneous remedial step without the need for a high-capacitance capacitor.

A power switching device of the present invention includes a switching unit for supplying power to a main circuit by switching between power from a main power supply and power from a supplementary power supply, and a control unit for controlling the switching unit. The control unit includes a voltage detecting unit for detecting a voltage value of the power supplied by either the main power supply or the supplementary power supply. The power switching device comprises a first switch assisting unit, composed of semiconductor switching elements, for feeding the power from the main power supply to the main circuit when the voltage detecting unit detects that the voltage value of the power is above a predetermined value, and a second switch assisting unit, composed of semiconductor switching elements, for feeding the power from the supplementary power supply to the main circuit when the voltage detecting unit detects that the voltage value of the power is below the predetermined value.

Preferably. the control unit includes an inverter for inverting an output of the voltage detecting unit. The voltage detecting unit outputs a LOW-state signal when the voltage value rises above the predetermined value, while outputting a HIGH-state signal when the voltage value drops below the predetermined value. The control unit drives the first switch assisting unit when the output of the voltage detecting unit input through the inverter is at a HIGH state, while driving the second switch assisting unit when the direct output of the voltage detecting unit, with the inverter bypassed, is at a HIGH state.

In accordance with the present invention, power supplying to the main circuit is extremely fast carried out through the first switch assisting unit or the second switch assisting unit. This arrangement substantially reduces the need for discharging power stored in a capacitor, permitting the capacitance of the capacitor to be reduced and a cost reduction and a compact design to be implemented in the entire device.

Preferably, the power switching device of the present invention includes one-shot multi-vibrators for outputting one-shot pulses having a predetermined pulse length in response to the output of the voltage detecting unit. The outputs of the one-shot multi-vibrators respectively drive the first switch assisting unit and the second switch assisting unit.

In accordance with the present invention, power supplying through the first switch assisting unit or the second switch assisting unit is performed for only the predetermined pulse length set in the respective one-shot multi-vibrator. For example, if a poor contact takes place in the control unit, the duration during which a current is permitted to flow in transistors in the first switch assisting unit or the second switch assisting unit is limited to a short time. For this reason, heat generation in the transistors or other components is controlled. This arrangement eliminates the need for the heat sinks of the transistors, permitting a cost reduction of the entire device.

Preferably, the power switching device of the present invention includes a first current limiter for limiting the current of the power supplied by the first switch assisting unit within a predetermined current range, and a second current limiter for limiting the current of the power supplied by the second switch assisting unit within a predetermined current range.

In accordance with the present invention, the first current limiter or the second current limiter limits its respective current. Even if the main circuit contains a high-capacitance capacitor, no large current is permitted to flow through the transistors in the first switch assisting unit or the second switch assisting unit at the moment the first switch assisting unit or the second switch assisting unit is connected to the main circuit. With this arrangement, a relatively low rating transistor can be employed, reducing the cost of the entire device.

Preferably, the power switching device of the present invention includes a second voltage detecting unit for detecting the voltage value of the power supplied to the main circuit, and a one-shot multi-vibrator for outputting a one-shot pulse having a predetermined pulse length in response to the output of the second voltage detecting unit. The output of the one-shot multi-vibrator drives the first switch assisting unit and the second switch assisting unit.

In accordance with the present invention, the power from the main power supply and the power from the supplementary power supply are immediately supplied regardless of the switching status of the control unit when the power supplied to the main circuit drops down to a lower voltage. Any instantaneous power interruption is thus avoided. This arrangement substantially reduces the need for discharging power stored in a capacitor, permitting the capacitance of the capacitor to be reduced and a cost reduction and a compact design to be implemented in the entire device.

DESCRIPTION OF THE PREFERRED EMBODIMENTS

Figure 1:
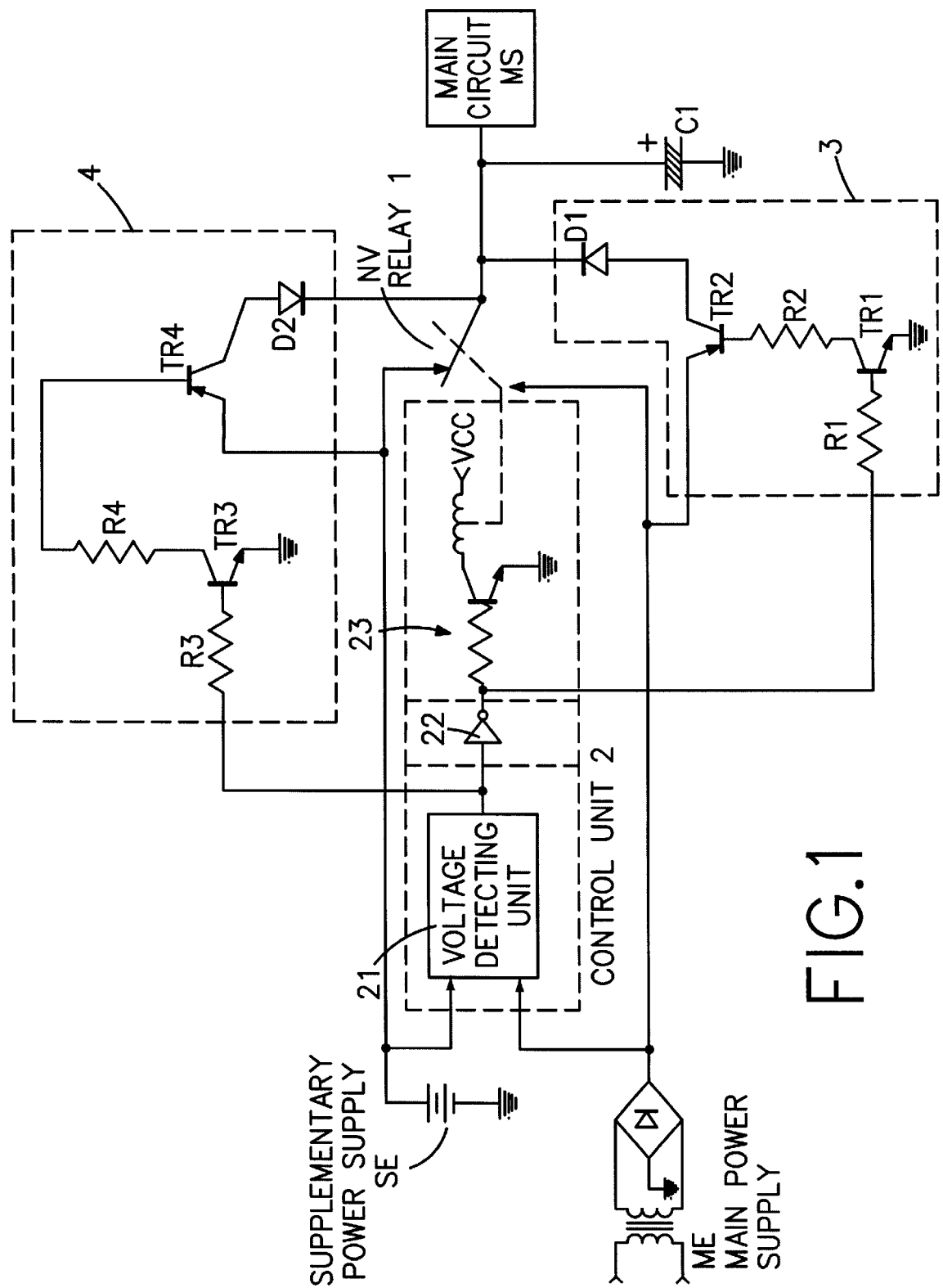
FIG. 1 is a block diagram of a first embodiment of the power switching device of the present invention.

A first embodiment of the present invention is discussed, referring to the drawings. FIG. 1 is a block diagram of the first embodiment of a power switching device of the present invention. The power switching device is housed in a control panel (not shown). The power switching device switches between power supplied from a main power supply ME (utility service line, for example, a commercial 100-volt power line) external to the control panel and power supplied from a supplementary power supply SE (of 24 VDC, for example) arranged in the control panel and supplies the selected power to a main circuit MS. The main circuit MS may be any circuit load. For example, in a power switching device arranged in a control panel for a fire alarm system, the main circuit MS may be a circuit for receiving a fire signal, controlling fire alarming, and performing other processes.

Referring to FIG. 1, the power switching device, like the conventional power switching device, includes an NV (No-Voltage) relay 1 as a switching element, a control unit 2 for controlling the NV relay 1, and a capacitor C1.

The control unit 2 includes a voltage detecting unit 21 for detecting the voltage of the power supplied by either the supplementary power supply SE or the main power supply ME, a NOT gate 22, namely, an inverter, for inverting an output signal of the voltage detecting unit 21, and a driver 23 for driving the NV relay 1 in response to an output of the NOT gate 22. The voltage detecting unit 21 compares its own preset voltage ES1 with the voltage value (hereinafter referred to as supply voltage value E1) of the power supplied by the supplementary power supply SE or the main power supply ME. The voltage detecting unit 21 outputs a LOW-state signal when the supply voltage value E1 is larger than the voltage value ES1, or a HIGH-state signal when the supply voltage value E1 is smaller than the voltage value ES1. The NOT gate 22 outputs a HIGH-state signal in response to the LOW-state signal from the voltage detecting unit 21, while outputting a LOW-state signal in response to the HIGH-state signal from the voltage detecting unit 21. The driver 23 includes a resistor and a transistor to voltage-divide a voltage Vcc at a predetermined ratio. The driver 23 activates its transistor in response to the input of the HIGH-state signal only, thereby applying a voltage to the NV relay 1. The NV relay 1 is thus switched to the main power supply ME.

The capacitance of the capacitor C1 is low (within a range from several microfarads to several hundred microfarads), compared to the conventional capacitor. With its stored power. the capacitor C1 compensates for a lack of power occurring during a power switching operation.

Unlike the conventional power switching device, the power switching device of the present invention includes a first switch assisting unit 3 and a second switch assisting unit 4, as shown in FIG. 1. The first switch assisting unit 3 includes transistors TR1 and TR2. as semiconductor switching elements, low-resistance resistor R1 and R2, and a diode D1. In the first switch assisting unit 3, the transistor TR1 is connected to the output of the NOT gate 22 as shown. The transistor TR1, driven by the output of the NOT gate 22, in turn drives the transistor TR2, thereby feeding the power supplied by the main power supply ME to the main circuit MS. The second switch assisting unit 4 is composed of transistors TR3 and TR4, as semiconductor switching elements, low-resistance resistors R3 and R4, and a diode D2. In the second switch assisting unit 4. the transistor TR2 is connected to the input of the NOT gate 22 (namely, the output of the voltage detecting unit 21). The transistor TR3, driven by the output of the voltage detecting unit 21, in turn drives the transistor TR4, thereby feeding the power supplied by the supplementary power supply SE to the main circuit MS. Each of the first switch assisting unit 3 and the second switch assisting unit 4 supplies power, only when it is fed with the HIGH-state signal. The operation of these units will be discussed later.

The power switching operation of the power switching device thus constructed is now discussed.

The NV relay 1 is connected to the supplementary power supply SE at its initial state prior to the power application to the control panel, in the same manner as in the conventional art. At the power-on operation of the supplementary power supply SE and the main power supply ME, the power from the supplementary power supply is immediately fed to the main circuit MS because the NV relay 1 remains connected to the supplementary power supply SE. The main circuit is now ready to operate. The capacitor C1 is charged with the power supplied by the supplementary power supply SE.

The voltage detecting unit 21 outputs the LOW-state signal when it detects that the supply voltage value E1 rises above the voltage value ES1. Although the LOW-state signal is first fed to the second switch assisting unit 4, the LOW-state signal cannot activate the second switch assisting unit 4 because of its low level, and no power supplying is performed through the second switch assisting unit 4.

The LOW-state signal output by the voltage detecting unit 21 and then fed to the NOT gate 22, is inverted into a HIGH-state signal therethrough, and is fed to the first switch assisting unit 3. When the HIGH-state signal is fed to the transistor TR1 in the first switch assisting unit 3, the transistor TR1 becomes conductive, allowing a current to flow therethrough, and driving the transistor TR2. Since the transistor TR2 is configured with its emitter connected to the main power supply ME and its collector connected to the main circuit MS (via the diode D1) as shown, the power from the main power supply ME is fed to the main circuit MS via the transistor TR2. The diode D1 rectifies the current flowing therethrough.

The signal, which is inverted into the HIGH-state signal through the NOT gate 22, is also output to the driver 23. The driver 23 activates its own transistor, feeding a voltage to the NV relay 1, and thereby switching the NV relay 1 to the main power supply ME.

The operation of the first switch assisting unit 3 is extremely fast completed within a duration of several microseconds in accordance with the characteristics of the transistors. The power from the main power supply ME is thus supplied via the first switch assisting unit 3 before the NV relay 1 completes its operation. Since there is almost no need for discharging the power stored in the capacitor C1, a small capacitance capacitor C1 works as already discussed.

When the voltage detecting unit 21 detects that the supply voltage value E1 drops below the voltage value ES1 in the event of an instantaneous power interruption of the main power supply ME after switching to the main power supply ME, the voltage detecting unit 21 outputs a HIGH-state signal. The HIGH-state signal is first fed to the second switch assisting unit 4. When the HIGH-state signal is fed to the transistor TR3 in the second switch assisting unit 4, the transistor TR3 becomes conductive, allowing a current to flow therethrough. The transistor TR4 is thus driven by the current. As shown, the transistor TR4 is configured with its emitter connected to the supplementary power supply SE and with its collector connected to the main circuit MS (via the diode D2). When driven to be conductive, the transistor TR4 feeds the power from the supplementary power supply SE to the main circuit MS. The diode D2 then rectifies the current flowing therethrough.

The HIGH-state signal, output from the voltage detecting unit 21 and then fed to the NOT gate 22, is inverted into a LOW-state signal therethrough. Although the LOW-state signal is fed to the first switch assisting unit 3, the first switch assisting unit 3 remains inoperative because of its low level, and no power supplying is performed through the first switch assisting unit 3. When the LOW-state signal is fed to the driver 23, the transistor in the driver 23 becomes non-conductive. The driver 23 suspends the voltage application to the NV relay 1. The NV relay 1 is then switched back to the supplementary power supply SE. The power from the supplementary power supply is thus fed to the main circuit MS.

The operation of the second switch assisting unit 4 is also fast completed in the same manner as that of the first switch assisting unit 3. The power from the supplementary power supply SE is thus supplied via the second switch assisting unit 4 before the NV relay 1 completes its operation. Here again, a small capacitance capacitor C1 works.

Figure 2:
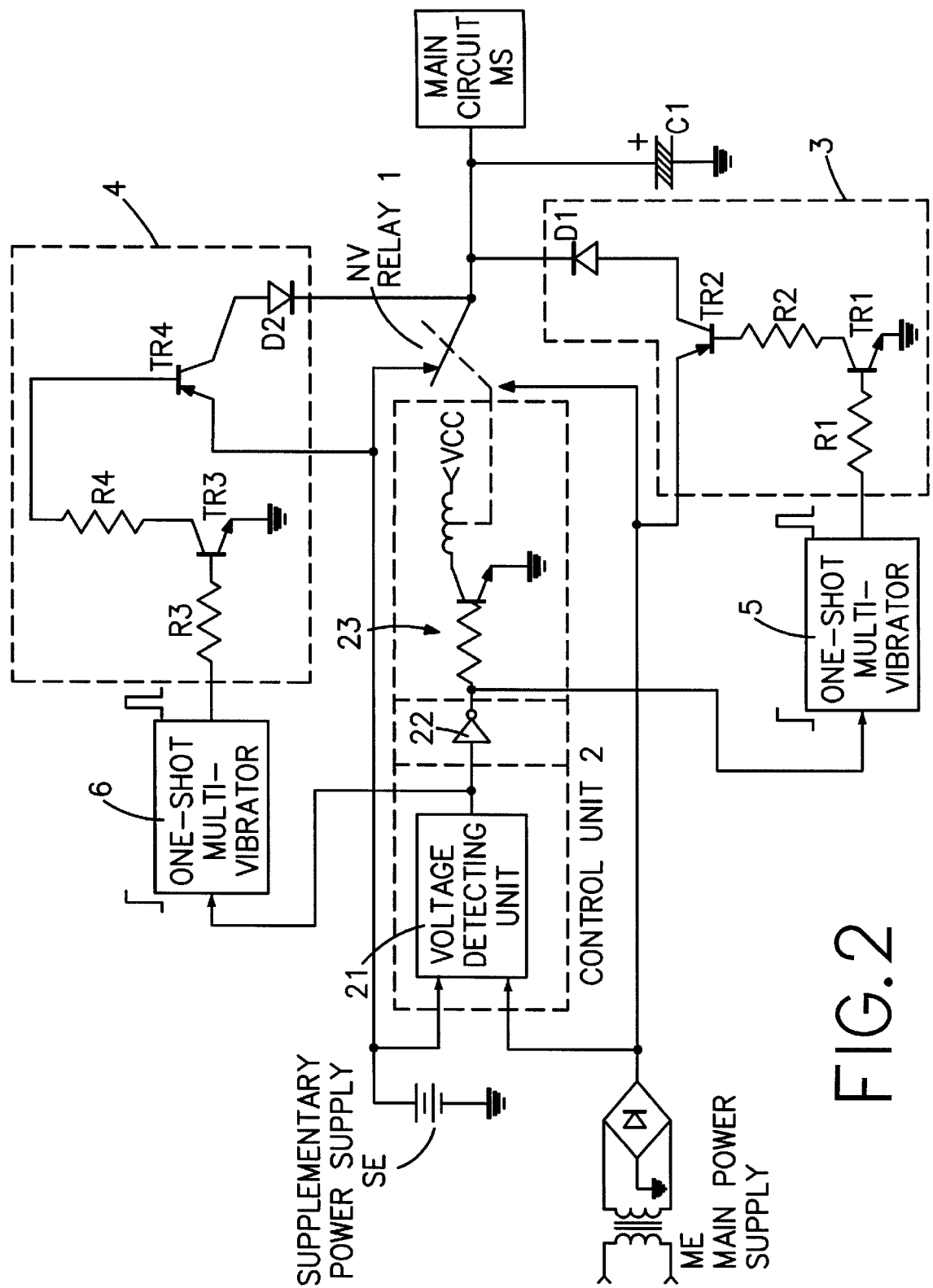
FIG. 2 is a block diagram of a second embodiment of the power switching device of the present invention.

A second embodiment of the present invention is now discussed, referring to FIG. 2. FIG. 2 is a block diagram of the power switching device of the present invention. Unless otherwise particularly noted, the construction of the second embodiment remains unchanged from that of the first embodiment, and like elements are identified with like reference numerals.

Referring to FIG. 2. the power switching device of the second embodiment includes a one-shot multi-vibrator 5 in the line between the output of the NOT gate 22 and the first switch assisting unit 3, and a one-shot multi-vibrator 6 in the line between the voltage detecting unit 21 and the second switch assisting unit 4.

Each of the one-shot multi-vibrators 5 and 6 outputs a HIGH-state signal having a predetermined length in response to the HIGH-state signal input. The predetermined length refers to a duration of time required to switch the NV relay or longer time, and is set to be 100 ms, for example.

The operation of the one-shot multi-vibrators 5 and 6, out of the power switching operation, is now discussed. The operation, unless otherwise particularly discussed, remains identical to that of the first embodiment.

In the initial state in which the NV relay 1 remains connected to the supplementary power supply, the power-on operation of the supplementary power supply SE and the main power supply ME is performed, and the voltage detecting unit 21 outputs the LOW-state signal. Although the LOW-state signal is first fed to the one-shot multi-vibrator 6, the one-shot multi-vibrator 6 gives no output because of a low level of the signal. On the other hand, when the HIGH-state signal, inverted by the NOT gate 22, is input to the one-shot multi-vibrator 5, the one-shot multi-vibrator 5 outputs a HIGH-state signal having a predetermined length. The first switch assisting unit 3 is therefore driven by the predetermined length of time, during which the transistor TR2 feeds the power from the main power supply ME to the main circuit MS.

When the voltage detecting unit 21 detects that the supply voltage value E1 drops below the voltage value ES1 in the event of an instantaneous power interruption of the main power supply ME after switching to the main power supply ME, the voltage detecting unit 21 outputs a HIGH-state signal. The HIGH-state signal is fed to the one-shot multi-vibrator 6. In response, the one-shot multi-vibrator 6 outputs a HIGH-state signal having a predetermined length. The second switch assisting unit 4 is thus driven for the predetermined length, allowing the transistor TR4 to transfer the power from the main power supply SE to the main circuit MS.

In this embodiment, the first switch assisting unit 3 or the second switch assisting unit 4 feeds power for the predetermined length of time set in the one-shot multi-vibrator 5 or 6. Even when the NV relay 1 suffers from a poor contact, the duration throughout which a current flows through resistors R1–R4 and transistors TR1–TR4 is limited to a short period of time. Heat generation in the resistors R1–R4 and transistors TR1–TR4 is thus controlled. Heat sinks of the transistors TR1–TR4 may be dispensed with.

Figure 3:
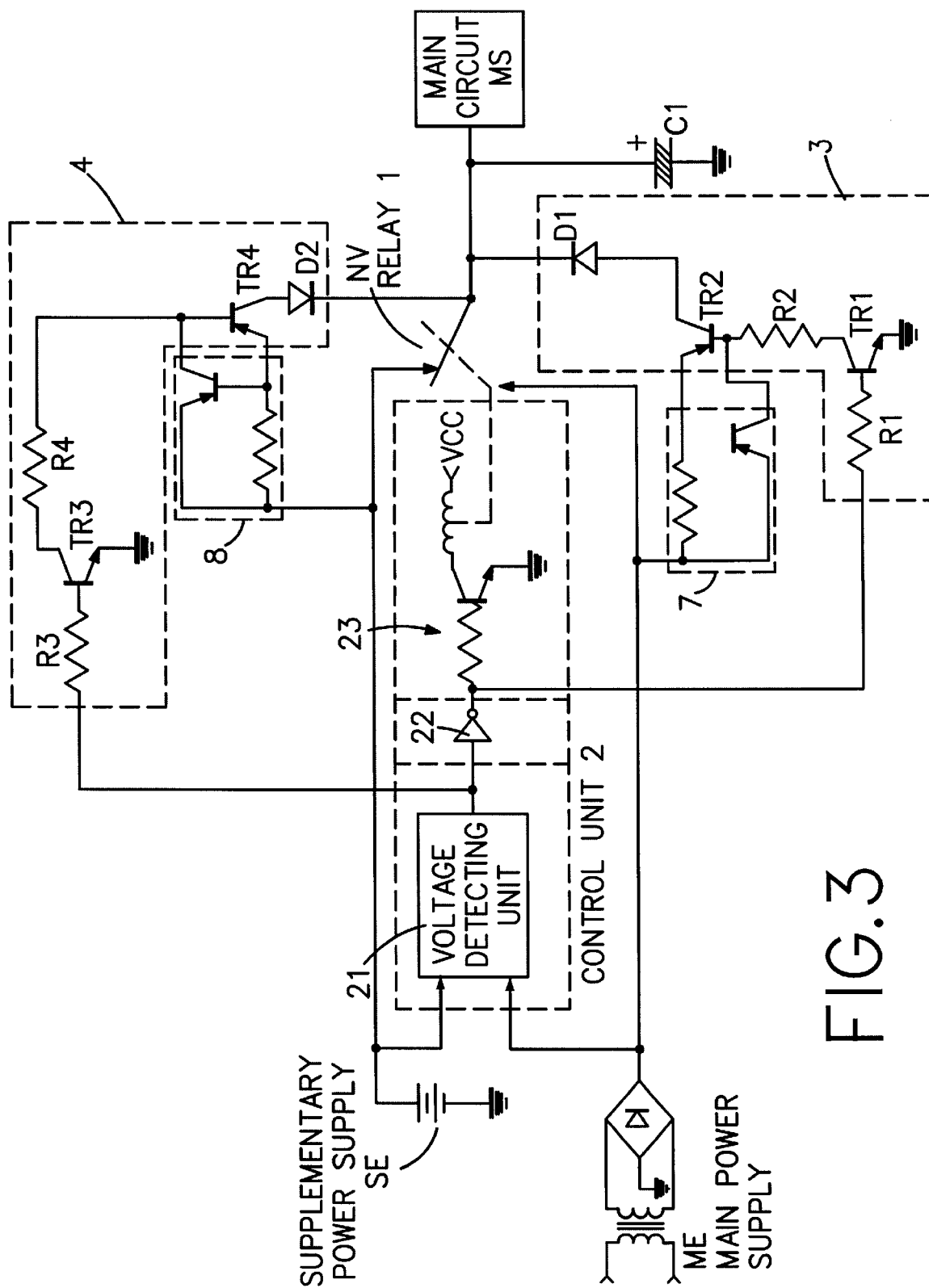
FIG. 3 is a block diagram of a third embodiment of the power switching device of the present invention.

A third embodiment of the present invention is discussed, referring to FIG. 3. FIG. 3 is a block diagram of the third embodiment of the power switching device of the present invention. The third embodiment remains unchanged from the first embodiment, unless otherwise particularly noted, and like elements are designated with like reference numerals.

Referring to FIG. 3, the power switching device of the third embodiment includes a first current limiter 7, arranged in the line between the main power supply ME and the transistor TR2 in the first switch assisting unit 3, for limiting the current of the power fed to the first switch assisting unit 3 within a predetermined range. Also provided in the line between the supplementary power supply SE and the transistor TR4 in the second switch assisting unit 4 is a second current limiter 8 for limiting the current of the power fed to the second switch assisting unit 4 within a predetermined range. The predetermined ranges refer to the ones within which a current flowing through the transistor TR2 or TR4 is as small as possible but still large enough to drive the main circuit MS without any problem created.

The operation of the first current limiter 7 and the second current limiter 8 is discussed. The operation, unless otherwise discussed, remains unchanged from that of the first embodiment.

In the initial state in which the NV relay 1 remains connected to the supplementary power supply SE, the power-on operation of the supplementary power supply SE and the main power supply ME is performed, and the voltage detecting unit 21 outputs the LOW-state signal. The LOW-state signal is inverted through the NOT gate 22 into a HIGH-state signal, which then drives the first switch assisting unit 3. Within the predetermined range, the first current limiter 7 limits the current value of the power which is fed through the transistor TR2 from the main power supply ME to the main circuit MS.

When the voltage detecting unit 21 detects that the supply voltage value E1 drops below the voltage value ES1 in the event of an instantaneous power interruption of the main power supply ME after switching to the main power supply ME, the voltage detecting unit 21 outputs a HIGH-state signal. The HIGH-state signal drives the second switch assisting unit 4. Within the predetermined range, the current limiter 8 limits the current value of the power which is fed through the transistor TR4 from the supplementary power supply ME to the main circuit MS.

The first current limiter 7 and the second current limiter 8 limit the respective currents. Even if the main circuit MS contains a high-capacitance capacitor, no large current is permitted to flow through the transistor TR2 in the first switch assisting unit 3 or the transistor TR4 in the second switch assisting unit 4 at the moment the first switch assisting unit 3 or the second switch assisting unit 4 is connected to the main circuit. With this arrangement, relatively low rating transistors TR2 and TR4 can be employed, thereby reducing the cost of the entire device.

Figure 4:
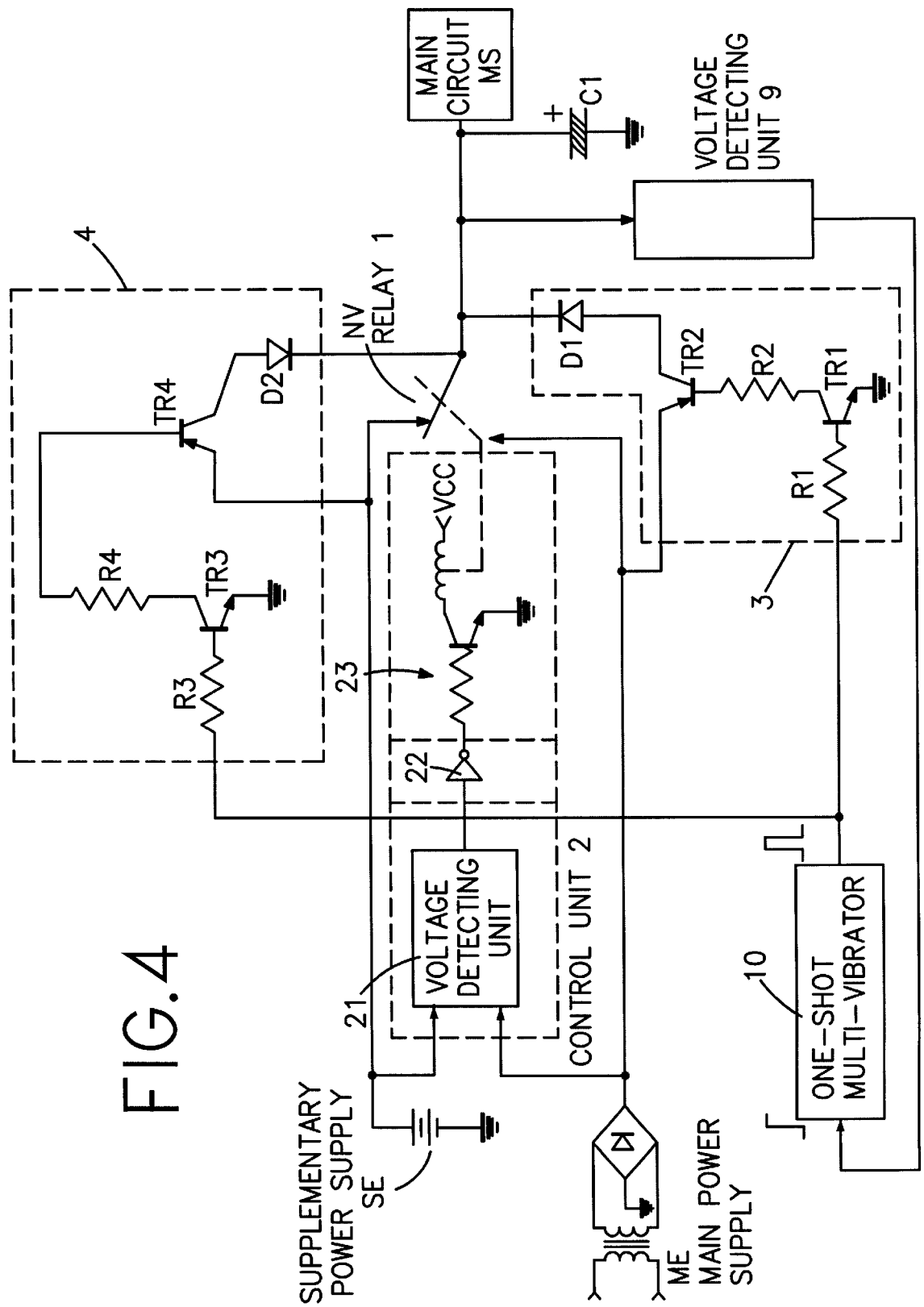
FIG. 4 is a block diagram of a fourth embodiment of the power switching device of the present invention.
Figure 5:
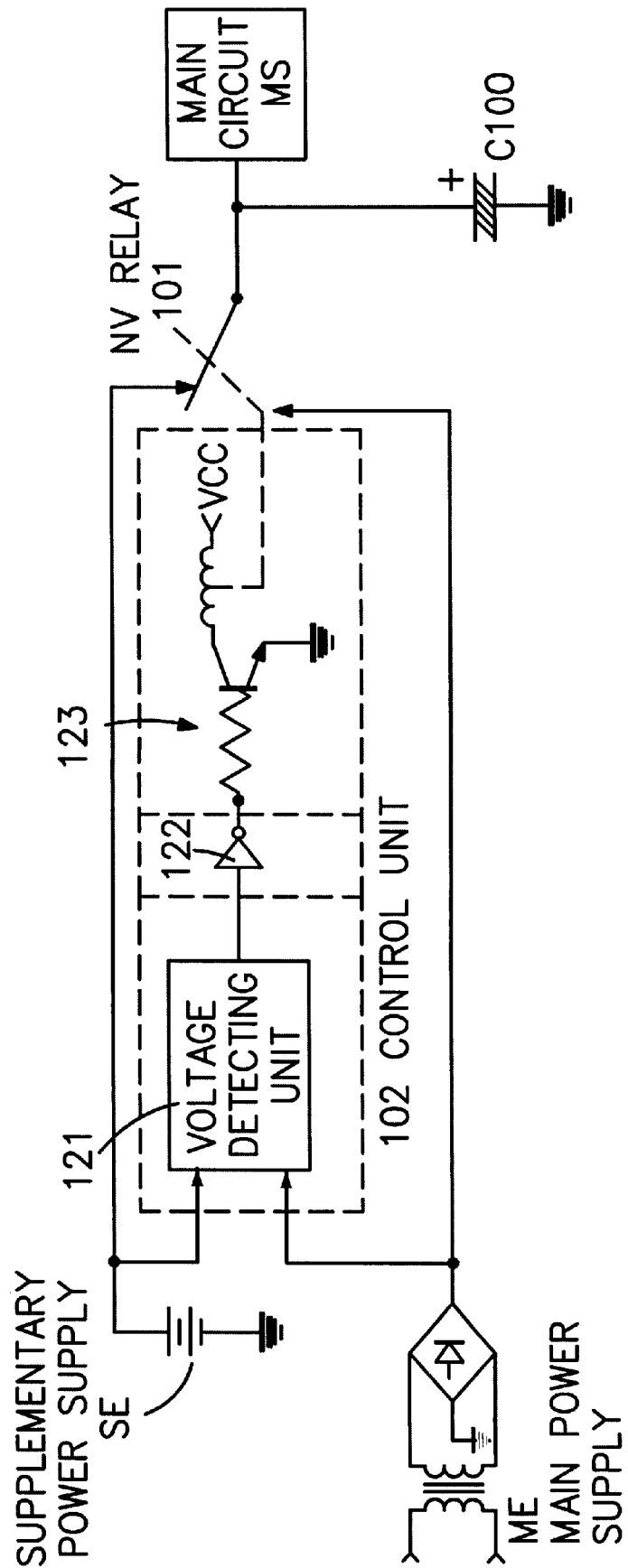
FIG. 5 is a block diagram of a conventional power switching device.

A fourth embodiment of the present invention is now discussed, referring to FIG. 4. FIG. 4 is a block diagram of the fourth embodiment of the power switching device of the present invention. Unless otherwise discussed, the construction of the power switching device remains unchanged from that of the first and second embodiments, and like elements are designated with like reference numerals.

Referring to FIG. 4, the power switching device of the present invention includes a second voltage detecting unit 9 (hereinafter simply referred to as voltage detecting unit 9) for detecting the voltage value of the power supplied to the main circuit MS, and a one-shot multi-vibrator 10 for outputting a one-shot pulse having a predetermined length in response to the output of the voltage detecting unit 9. Connected to the output of the one-shot multi-vibrator 10 as shown are a resistor R1 in the first switch assisting unit 3 and a resistor R3 in the second switch assisting unit 4. The predetermined length remains the same as in the second embodiment.

The operation of the voltage detecting unit 9 and the one-shot multi-vibrator 10 is now discussed. Unless otherwise particularly discussed, the operation remains unchanged from that of the first embodiment.

The voltage detecting unit 9 continuously monitors the voltage value of the power supplied to the main circuit MS. Specifically, the voltage detecting unit 9 compares a voltage value E2 (within a range of 16 to 20.4 volts, for example) preset therewithin, with a supply voltage value E2 of the power, and outputs a HIGH-state signal when the supply voltage value E2 drops below the voltage value ES2.

In response to the HIGH-state signal, the one-shot multi-vibrator 10 outputs a HIGH-state signal having the predetermined length. The first switch assisting unit 3 and the second switch assisting unit 4 are concurrently driven for the predetermined length, permitting powers from the main power supply ME and the supplementary power supply SE to be concurrently supplied to the main circuit MS.

In this operation, when the power supplied to the main circuit MS drops to a low voltage, powers from the main power supply ME and the supplementary power supply SE are instantaneously supplied to prevent a power interruption, regardless of the switching status of the NV relay 1. Since there is almost no need for discharging the power stored in the capacitor C1, a small capacitance capacitor C1 works as already discussed.

The first through fourth embodiments of the present invention have been discussed. The present invention is not limited to the above embodiments. Various medications and changes are possible without departing from the spirit and scope of the invention. For example, the NV relay, the control unit, and the capacitor may have any different construction. Other switching means may be substituted for the NV relay. If the first switch assisting unit 3 and the second switch assisting unit 4 can completely avoid a power interruption, the capacitor 1 may be entirely eliminated. The construction of the NOT gate 22 and the driver 23 in the control unit may be modified in accordance with the switching means. The predetermined pulse lengths of the one-shot multi-vibrators and the current range of the current limiters may be set to any appropriate values.

The arrangements of the first through fourth embodiments may be combined to form a power switching device. For example, the current limiters of the third embodiment may be added to the power switching device of the fourth embodiment.

What is claimed is:

1. A power switching device having a switching unit for supplying power to a main circuit by switching between power from a main power supply and power from a supplementary power supply, and a control unit for controlling the switching unit, the device comprising:

a voltage detecting unit, in the control unit, for detecting a voltage value of the power supplied by either the main power supply or the supplementary power supply;

a first switch assisting unit, composed of semiconductor switching elements, for feeding the power from the main power supply to the main circuit when the voltage detecting unit detects that the voltage value of the power is above a predetermined value; and a second switch assisting unit, composed of semiconductor switching elements, for feeding the power from the supplementary power supply to the main circuit when the voltage detecting unit detects that the voltage value of the power is below the predetermined value.

2. A power switching device according to claim 1, wherein the control unit comprises an inverter for inverting an output of the voltage detecting unit, and wherein the voltage detecting unit outputs a LOW-state signal when the voltage value rises above the predetermined value, while outputting a HIGH-state signal when the voltage value drops below the predetermined value, and the control unit drives the first switch assisting unit when the output of the voltage detecting unit input through the inverter is at a HIGH state, while driving the second switch assisting unit when the direct output of the voltage detecting unit, with the inverter bypassed, is at a HIGH state.

3. A power switching device according to one of claims 1 and 2, further comprising one-shot multi-vibrators for outputting one-shot pulses having a predetermined pulse length in response to the output of the voltage detecting unit, wherein the outputs of the one-shot multi-vibrators respectively drive the first switch assisting unit and the second switch assisting unit.

4. A power switching device according to one of claims 1 and 2, further comprising a first current limiter for limiting the current of the power supplied by the first switch assisting unit within a predetermined current range, and a second current limiter for limiting the current of the power supplied by the second switch assisting unit within a predetermined current range.

5. A power switching device according to claim 1, further comprising a second voltage detecting unit for detecting the voltage value of the power supplied to the main circuit, and a one-shot multi-vibrator for outputting a one-shot pulse having a predetermined pulse length in response to the output of the second voltage detecting unit, wherein the output of the one-shot multi-vibrator drives the first switch assisting unit and the second switch assisting unit.

* * * * *